Nov. 30, 1926.
J. E. McGINNESS
DAMPER OPERATING DEVICE
Filed July 13, 1926
1,609,028
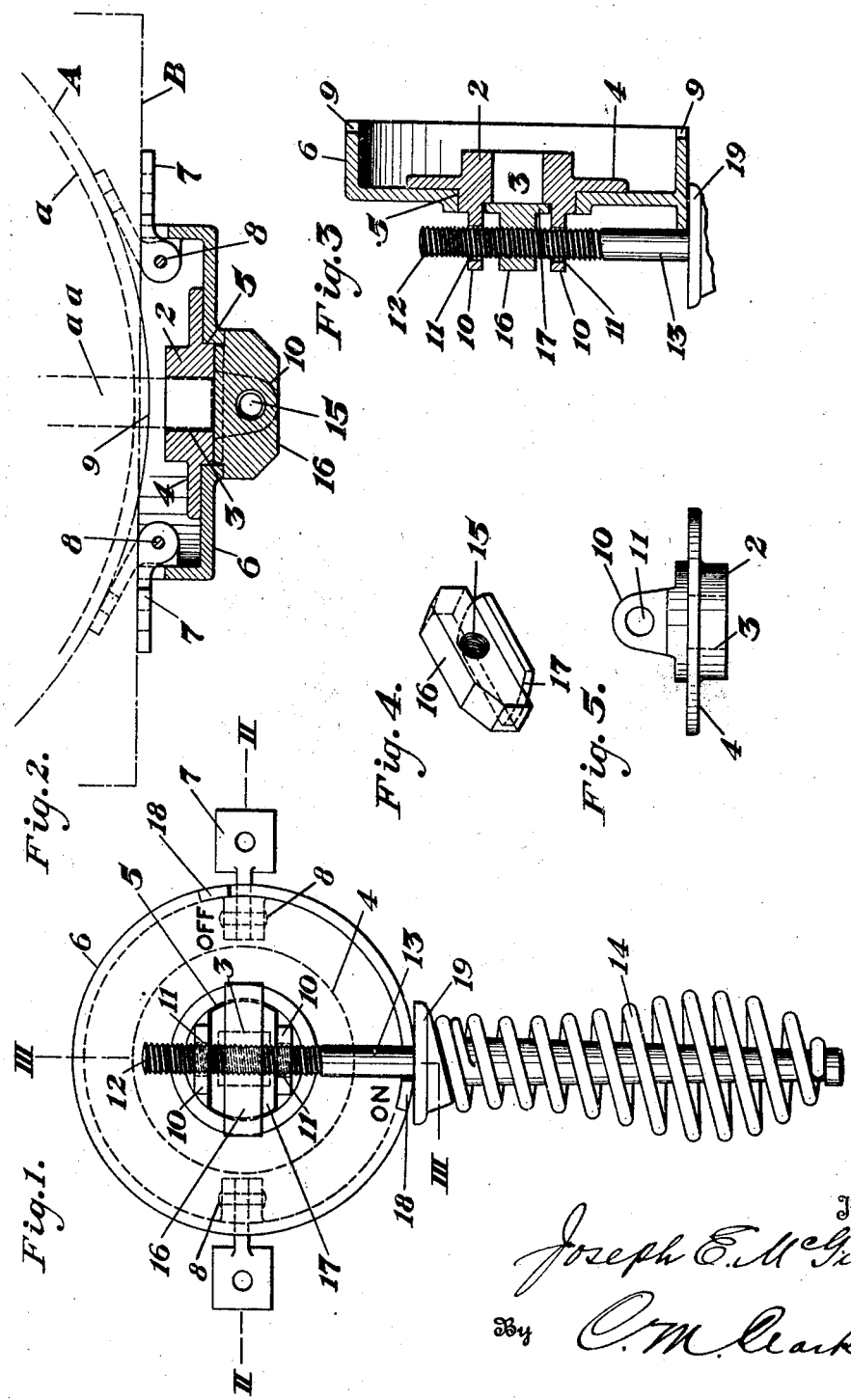
Inventor
Joseph E. McGinness
By C. M. Clarke
Attorney Patented Nov. 30, 1926.

1,609,028

UNITED STATES PATENT OFFICE.

JOSEPH E. McGINNESS, OF PITTSBURGH, PENNSYLVANIA.

DAMPER-OPERATING DEVICE.

Application filed July 13, 1926. Serial No. 122,149.

My invention refers to means for actuating dampers, circulation controlling gates, etc., which it is desirable to locate and hold in various positions.

The invention consists of an improved rotating and locking attachment, as hereinafter described, and is an improvement in that class of devices disclosed in my prior Patent No. 1,009,769 issued November 28, 1911.

Referring to the drawings, showing the invention:

Fig. 1 is a face view of the device in elevation;

Fig. 2 is a horizontal section on the line II—II of Fig. 1, showing the application to a conduit provided with a damper;

Fig. 3 is a vertical section on the line III—III of Fig. 1;

Fig. 4 is a detail view of the central clamping nut, detached;

Fig. 5 is a similar view of the rotary stem engaging socket member.

In the drawings, A or B represents a circulation conduit, in which a damper of the butterfly type, as $a$, is rotatably mounted in the usual manner, for operation across the conduit area. Such damper is provided with a squared or otherwise shaped turning stem $a'$, the end of which extends beyond the conduit, as shown in dotted lines, for engagement by the rotating device.

The operative member of the present improved construction is the rotatable member 2 having a central squared or otherwise shaped socket 3 for rotative connection with the terminal of stem $a'$.

Member 2 is provided with an inner retaining flange 4, and extends outwardly through a circular opening 5 in the central front of a circular casing 6. Said casing is adapted to be secured upon the curved or flat surface of either conduit A or B by means of holding wings 7, which may be riveted in varying positions, as indicated in Fig. 2.

For purposes of adjustment, the securing wings 7 are pivotally connected at 8 to lugs on the inner opposite sides of the casing. The opposite edges of the casing are concaved at the middle, as at 9, for attachment to a round conduit, the remainder of the edge surfaces being continuously flat for attachment against a flat surface, as desired.

The outwardly projecting part of rotatable member 2, which extends through the circular opening 5 is provided with a pair of extending lugs 10, each provided with a clearance opening 11 for the threaded end portion 12 of stem 13 of operating handle 14.

The threaded portion 12 of the stem engages the threaded opening 15 of a nut 16 which is seated by its base flange 17 loosely between the lugs 10, as in Fig. 3. By such mounting, the member 2 may be rotated by handle 14 to any desired degree between peripheral stop lugs 18, of the casing, about 90 degrees apart.

The handle is provided with a shoulder 19 adapted to swing around the periphery of circular casing 6 with sufficient overlap to grip against it when screwed into the nut. When rotated to the desired extent to properly locate the damper, the handle is rotated to tighten the nut 16 and shoulder 19, thereby locking member 2 in position.

By such construction, the damper may be accurately and positively located and then locked in position by manipulation of the handle.

The construction and operation will be readily understood and appreciated from the foregoing description. The device is simple, strong, cheap, and efficient, and well adapted to the purposes in view. It may be changed in proportions, size, or other details, by the skilled mechanic, but all such changes are to be understood as within the scope of the principle of the invention.

What I claim is:

1. The combination with a damper or the like having a polygonal stem, of a holding frame, a rotatably mounted member therein having a stem engaging socket, and a rotating handle having a coacting member adapted to clamp the socket fixedly in position.

2. The combination with a damper or the like having a polygonal stem, of a holding frame, a rotatably mounted member therein having a stem engaging socket, and a rotating handle having a threaded stem and a nut thereon for clamping the socket fixedly in position.

3. The combination with a damper or the like having a polygonal stem, of a holding frame, a rotatably mounted member therein having a stem engaging socket, and a rotating handle having a threaded stem, a nut on the stem engaging the socket, and an abutment on the handle engaging the frame.

4. Means for rotating and fixedly holding a damper or the like consisting of a frame adapted to be attached to a conduit having an annular bearing edge, a stem socket rotatably mounted in the frame having a loosely mounted clamping nut, and a handle having a clamping abutment for engaging the annular bearing edge and a threaded stem engaging the nut.

5. Means for rotating and fixedly holding a damper or the like consisting of a frame adapted to be attached to a conduit having an annular bearing edge, a stem socket rotatably mounted in the frame having a clamping nut, and a handle having an annular clamping portion for engaging the annular bearing edge and provided with a stem extending therebeyond and engaging the nut.

6. A damper adjusting and holding device consisting of a cap-shaped casing provided with pivotally connected attaching lugs for connection with a conduit wall, a stem socket rotatably mounted in the casing having guide lugs, a threaded nut between the lugs, and a handle having a clamping abutment for engaging the casing and a threaded stem extending through said lugs and engaging the nut.

7. A damper adjusting and holding device consisting of a cap-shaped casing provided with inner straight edges with middle oppositely located concaved clearance depressions therein and pivotally connected attaching lugs for mounting on either a flat or curved surface, a stem socket rotatably mounted in the casing, and means for rotating and holding the stem socket.

8. A damper adjusting and holding device consisting of a cap-shaped casing provided with inner straight edges with middle oppositely located concaved clearance depressions therein and pivotally connected attaching lugs for mounting on either a flat or curved surface, a stem socket rotatably mounted in the casing having a loosely mounted nut, and an operating handle having a threaded stem engaging the nut for tightening and loosening connection with the stem socket.

9. A damper adjusting and holding device consisting of a cap-shaped casing provided with inner straight edges with middle oppositely located concaved clearance depressions therein and pivotally connected attaching lugs for mounting on either a flat or curved surface, a stem socket rotatably mounted in the casing having a loosely mounted nut, and an operating handle having a threaded stem engaging the nut for tightening and loosening connection with the stem socket and provided with an abutment for effecting locking connection with the edge of the casing.

10. A damper adjusting and holding device consisting of a cap-shaped casing provided with an annular bearing edge and stop abutments thereon, a rotatable stem socket mounted in the casing having stem engaging lugs, a threaded nut between the lugs, and an operating handle having a projecting annular bearing edge for engaging the annular edge of the casing and a threaded stem extending through the lugs and engaging the nut.

In testimony whereof I hereunto affix my signature.

JOSEPH E. McGINNESS.